United States Patent Office 3,253,328
Patented May 31, 1966

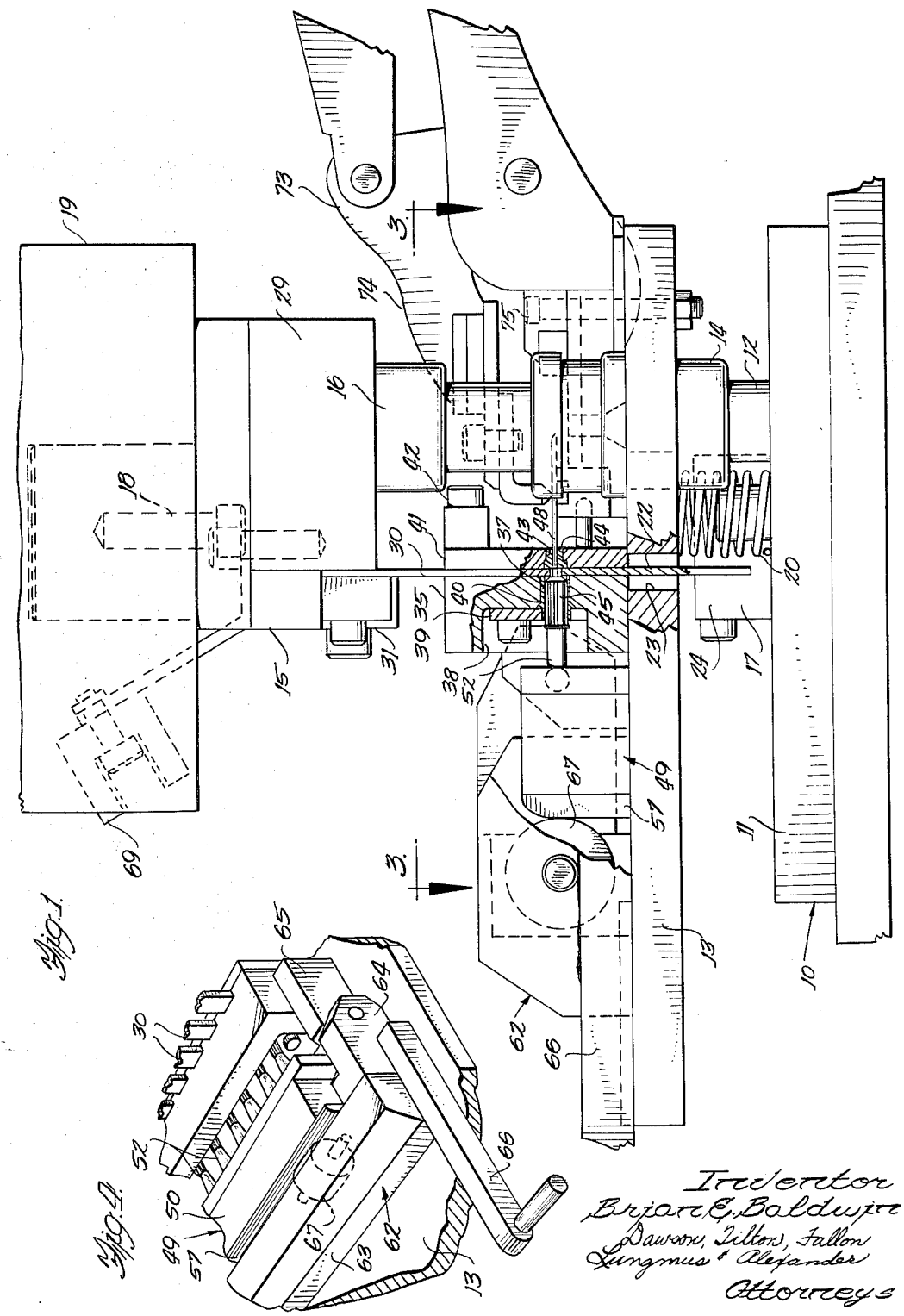

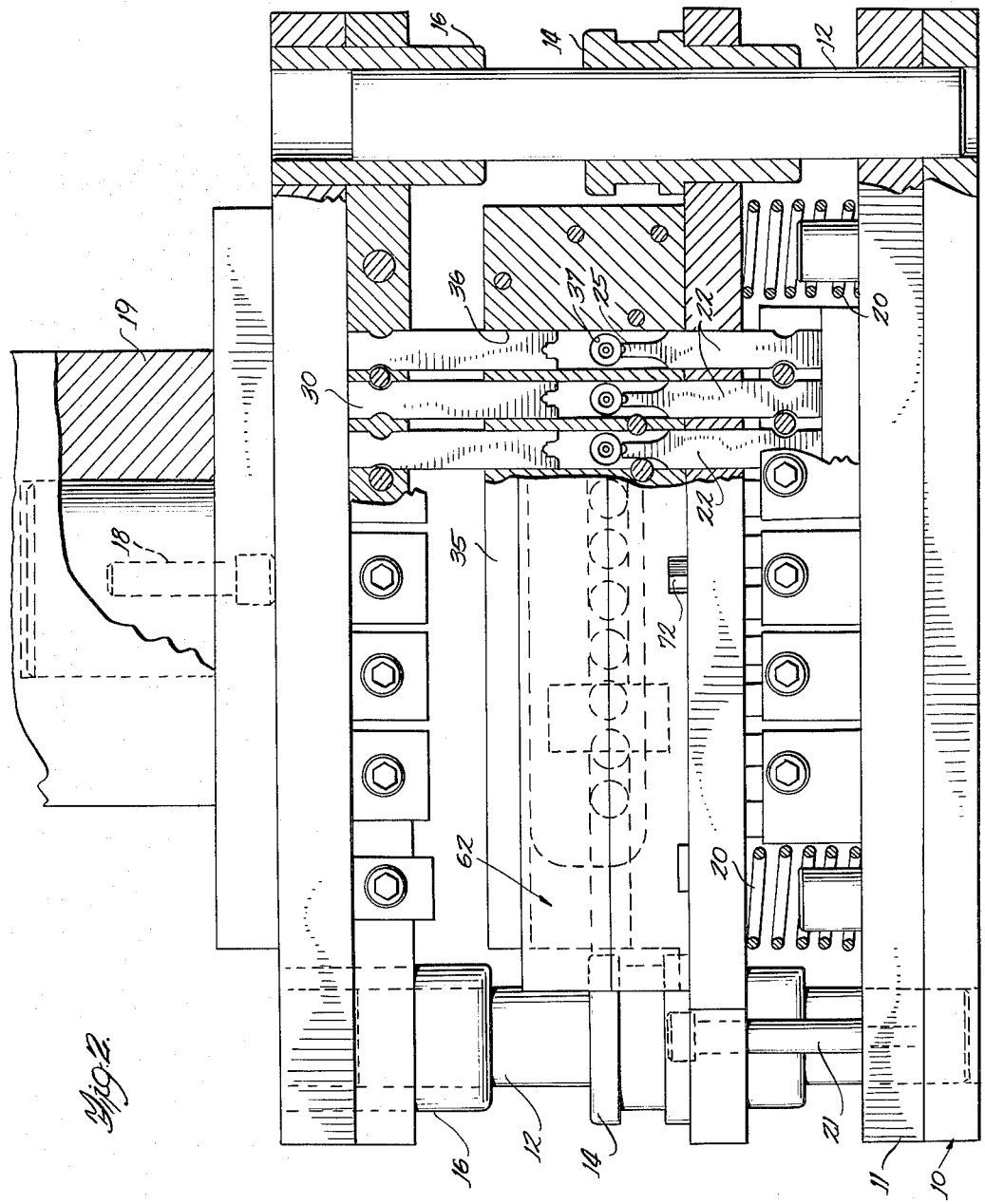

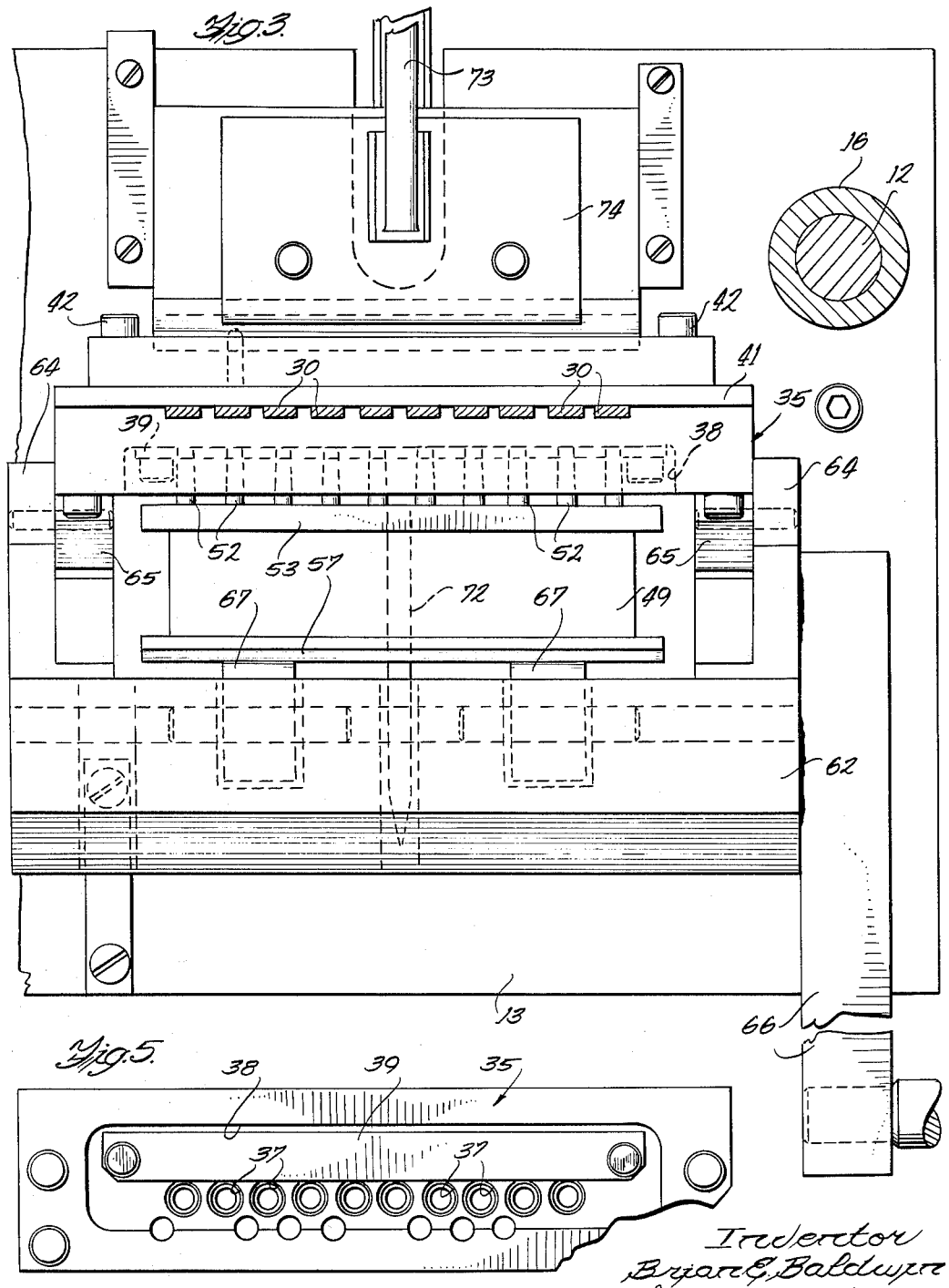

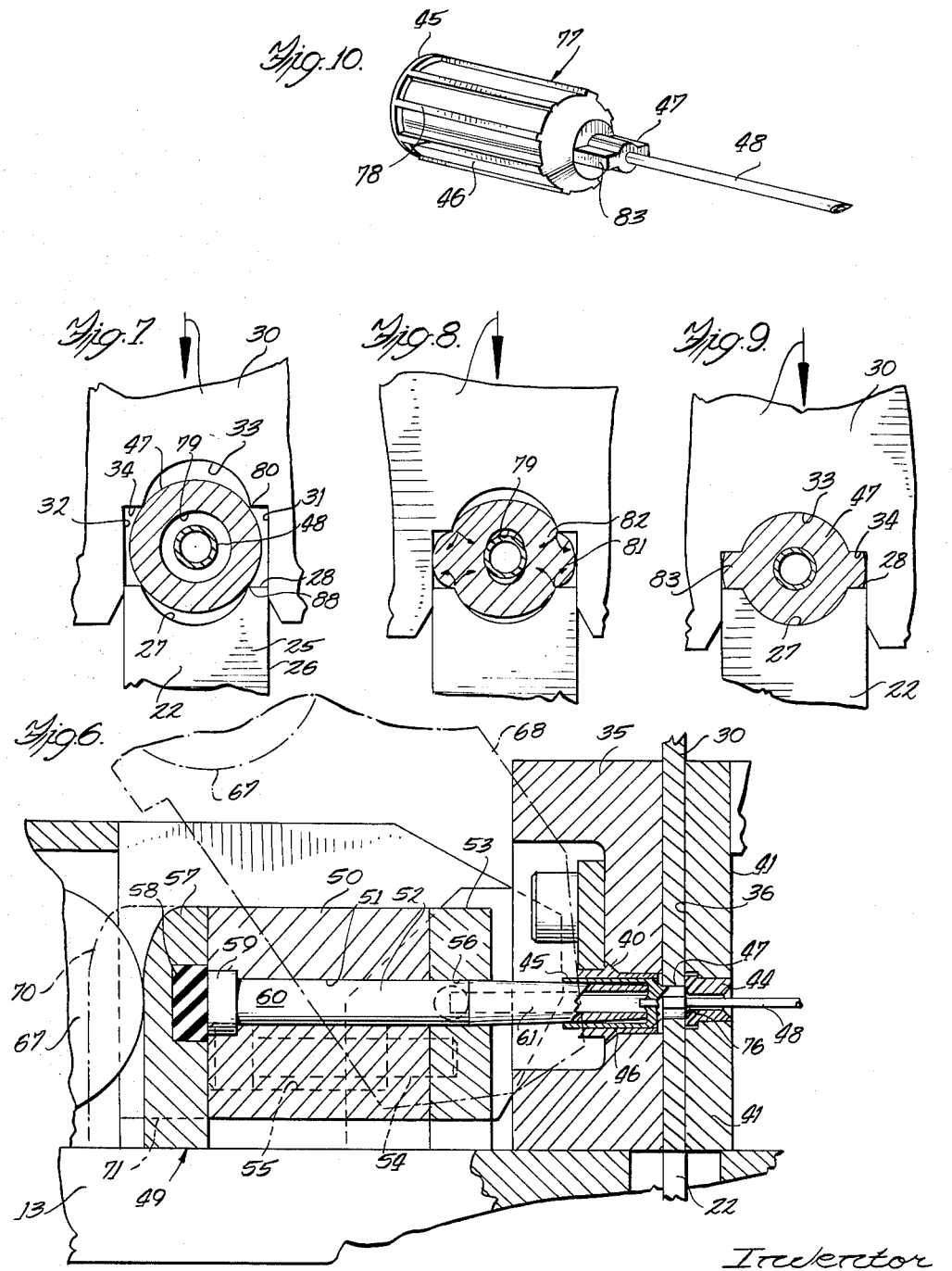

3,253,328
CANNULA AND HUB STAKING APPARATUS
Brian E. Baldwin, Evanston, Ill., assignor to Manufacturing Process Laboratories, Inc., Chicago, Ill., a corporation of Illinois
Filed May 11, 1962, Ser. No. 193,972
7 Claims. (Cl. 29—243.52)

This invention relates to an apparatus for securing cannulae are pre-formed hubs to produce finished hypodermic needle units.

While various devices are known for securing cannulae and hubs together, such devices are generally unsuitable for high-speed mass production techniques. For instance, in the operation of a conventional device where three or more jaws converge to force the sleeve or neck of a hub into tight contact with a cannula extending therethrough, it is apparent that the device can stake only a single cannula at ony one time. This means that finished hypodermic needle units must be formed successively rather than simultanueosly by a single machine, with the result that the output capacity of such a machine is severely limited. Furthermore, a multiple-jaw staking device generally lacks means for restraining axial flow of the material of a hub as that hub is compressed and, therefore, it is necessary to provide a close fit initially between the pre-formed parts. Not only does this requirement for a close initial fit increase the problems of high-speed assembly, but it prevents attachment of a hub having a given bore size with a cannula having any other than a certain predetermined outside diameter. Therefore, where cannulae of different gauges are to be stacked, it has been necessary to provide a variety of hubs with a corresponding range of bore sizes.

Accordingly, it is a principal object of the present invention to overcome the aforementioned defects and disadvantages in prior hub and cannula staking operations. Specifically, it is an object to provide an apparatus by which a plurality of cannulae may be staked at the same time. Another object is to provide an apparatus for securing cannulae to hubs which is relatively simple and which may be readily automated for high-speed operation. Another object is to provide a staking an apparatus which permit the use of hubs having substantially larger bore diameters than the outside diameters of the cannulae to be mounted therein, thereby simplifying assembly of the parts and permitting cannulae of different gauges to be mounted in hubs having the same initial bore sizes.

Other objects will appear from the specification and drawings in which:

FIGURE 1 is a broken side elevational view, taken partly in section, of a staking apparatus embodying the present invention;

FIGURE 2 is a front elevational view of the apparatus, taken partly in section to illustrate the arrangement of opposing punches therein;

FIGURE 3 is a horizontal sectional view of the apparatus taken along line 3—3 of FIGURE 1;

FIGURE 4 is a fragmentary perspective view illustrating the interrelationship between the clamping bar, hub bar assembly, and hub guide of the apparatus;

FIGURE 5 is a front elevational view of the hub guide;

FIGURE 6 is an enlarged broken sectional view illustrating the relationship between the clamping bar assembly, hub bar assembly, hub guide, and opposing punches of the apparatus when a cannula is being staked within the apertured neck of a hub;

FIGURE 7 is a greatly enlarged fragmentary cross-sectional view illustrating a first step in a staking operation;

FIGURE 8 is an enlarged view similar to FIGURE 7 but showing a second step in the staking operation;

FIGURE 9 is an enlarged sectional view similar to FIGURES 7 and 8 but showing a cannula fully staked or mounted within a hub;

FIGURE 10 is an enlarged perspective view illustrating a finished hypodermic needle unit.

In the embodiment of the invention illustrated in the drawings, the numeral 10 generally designates a staking apparatus comprising a stationary frame 11, a pair of upstanding guide posts 12 rigidly secured thereto, a platen 13 provided with guide bushings 14 which slidably receive the guide posts to permit vertical movement of the platen, an upper punch assembly 15 equipped with guide bushings 16 which slidably receive the upstanding posts, and a lower punch assmbly 17 rigidly secured to frame 11. It will be noted that the upper punch assembly is connected by bolts 18 to the lower end of a reciprocable ram 19, the ram being movable in reversing directions parallel with the axes of upstanding guide posts 12.

The horizontal platen 13 is movable between a raised position (FIGURE 2) and a lowered position (FIGURE 1) and is normally held in raised position by a pair of compression springs 20. The extent of upward movement of the platen is limited by headed pins 21 secured to the frame 11.

The lower punch assembly comprises a plurality of upstanding punches or dies 22 projecting upwardly through openings 23 in the platen and rigidly secured to the frame 11 by means of punch clamps 24. The punches are spaced uniformly apart and, as illustrated in FIGURE 3, extend along the same vertical plane.

As shown most clearly in FIGURES 1, 2 and 7, each lower punch 22 is of uniform thickness, preferably being formed from flat stock, and, when viewed from the front, is of generally rectangular shape with a reduced head portion 25. The narrow side surfaces 26 of the head portion are straight and parallel for a substantial proportion of the length thereof. At its upper end, the head is provided with an arcuate surface indentation 27 and a pair of lateral horizontal surfaces 28 (FIGURE 7).

The upper punch assembly 15 comprises an upper punch holder 29 having a series of depending punches 30 secured thereto by clamping element 31. Like punches 22, the upper punches 30 may be formed from flat stock and are generally rectangular in shape. At its lower end, each punch 30 is provided with a recess 31 having parallel side surfaces 32 spaced apart substantially the same distance as the side surfaces 26 of the head of each lower punch 22. Referring to FIGURE 7, it will be noted that the upper punch is provided with an arcuate surface indentation 33 and with lateral horizontal surfaces 34. Lateral surfaces 28 and 34 of each pair of punches are disposed in direct opposition, as are the arcuate surfaces 27 and 33.

Mounted directly upon platen 13 is a hub guide or hub guiding member 35. This member consists of a horizontally elongated rectangular block having a plurality of vertical channels 36 along the rear face thereof and having a series of horizontal openings 37 extending therethrough. The front face of the block is recessed at 38 and a clamping bar 39 is bolted within the recess to retain bushings 40 within the horizontal series of openings 37.

Directly behind the hub guiding member is a cannula guide or cannula guiding member 41. The cannula guiding member is detachably secured by bolts 42 to the hub guiding member 35 and has a series of horizontal openings 43 in register with openings 37. Within each of the openings 43 is a bushing 44.

Referring to FIGURE 6, it will be noted that the openings of the bushings 40 are adapted to accommodate the hubs 45 for hypodermic needle units. Specifically, the internal dimensions of the bushings are such that each bushing will receive the body portion 46 of a hub with the reduced neck or sleeve portion 47 of the hub projecting forwardly beyond the bushing and into the channel 36 which slidably receives and guides the upper and lower punches 30 and 22. The front end of a fully-inserted hub abuts the bushing 44 provided in cannula guiding member 41, bushing 44 serving to limit the axial flow of material of the hub as its neck is re-formed by the upper and lower punches. In addition, the apertured bushing 44 guides the insertion of cannula 48 and retains the cannula in proper position during a staking operation.

A hub bar assembly 49, illustrated most clearly in FIGURES 3, 4 and 6, rests upon platen 13 in front of hub guide 35 and is adapted to hold a plurality of hubs 45 within the openings 37 of the guide. The assembly 49 comprises a hub bar 50 having a plurality of horizontal and parallel openings 51 which slidably receive hub positioning pins 52. Along the front of the bar is a stripper plate 53 supported for limited independent movement relative to the bar by a mounting pin 54 (FIGURE 6). The enlarged head of the mounting pin is slidably received within cavity 55 of the hub bar, the axial dimensions of the cavity limiting the extent of free movement of the stripper plate. The stripper plate is provided with a plurality of openings 56 which are in register with the openings 51 of the hub bar and which also slidably receive the hub positioning pins 52.

Behind the hub bar and secured thereto is a backing plate 57. The upper rear surface of the backing plate is rounded when the plate is viewed in vertical section (FIGURE 6) and the forwardly-facing surface of the plate is grooved to support a cushioning element 58 formed of rubber or other resilient material. The cushioning element is disposed directly behind pins 52 and is intended to permit limited axial self-adjustment of the pins to equalize the axial force exerted upon hubs 45 when the hubs are held in staking positions.

Each hub positioning pin 52 has an enlarged head or rear end portion 59, a cylindrical shank or intermediate portion 60, and a tapered insert portion 61 at the pin's front end. As shown in FIGURE 6, the front end of the insert portion is blunted and is adapted to bear against the end wall of the hub (i.e., the rear end of neck portion 47) within the interior of hub body 46. It will be observed that the diameter of the gradually-tapered insert portion is sufficiently large that the outer surface of that portion snugly engages the inner surface of the hub body adjacent the mouth thereof.

The clamp bar assembly 62 comprises a bar 63 normally disposed behind the hub bar assembly 49 and extending in a direction parallel therewith, a pair of ears 64 secured to the bar and pivotally connected to stationary mounting elements 65, a handle-equipped lever arm 66 for pivoting the clamp bar, and a plurality of rollers 67 carried by the bar and engageable with the backing plate 57 of the hub bar assembly 49 to cam the hub bar assembly forwardly as the clamp bar assembly is lowered into the position illustrated in FIGURES 1 and 4. By raising lever 66, the clamp bar 63 may be pivoted upwardly into the raised position indicated by broken lines 68 in FIGURE 6. Any suitable means, such as magnet 69 (FIGURE 1) may be provided for retaining the clamp bar in its raised position. When the bar 63 is raised, the hub bar assembly 49 may be slid rearwardly from the position illustrated in FIGURES 1, 4 and 6 and withdrawn from beneath the raised bar 63. Similarly, when the clamp bar is raised, a hub bar assembly 49 with pre-formed hubs fitted upon the forward ends of pins 52 may be slid forwardly along the platen into the position indicated by broken line 70 (FIGURE 6). Thereafter, by lowering the clamping bar, the hub bar assembly 49 will be advanced into the position of FIGURES 1, 4 and 6.

To assist in properly positioning a loaded hub bar, the underside of the hub bar assembly may be provided with a center groove 71 which slidably receives a guide bar 72 secured to platen 13 (FIGURES 2 and 3).

The cannulae 48 may be inserted through the bushings 44 in the cannula guide member 41 by any suitable means. In the illustration given, a clamp 73 having upper and lower jaws 74 and 75 is provided for holding a plurality of cannulae in spaced parallel relation until they have been inserted through the bushings into the positions illustrated in FIGURES 1 and 6.

In the operation of the apparatus shown in the drawings, an operator first places a plurality of hubs upon the tapered ends of hub positioning pins 52. The loaded hub bar assembly is then urged forwardly beneath the raised clamping bar 62 and the clamping bar is swung downwardly to force hubs 45 against the bushings 44 of the cannula guide 41. As the hub bar assembly is cammed forwardly, the blunt ends of the positioning pins 52 are brought into contact with the inside end walls of the hubs and, therefore, the material of the sleeves or necks 47 of the hubs is restrained against axial flow when the upper and lower punches are brought together. If desired, however, bushings 44 may have their rear faces recessed slightly as indicated at 76 (FIGURE 6) to permit only a limited amount of forward axial flow.

A plurality of cannulae 48, carried by clamp 73, are then inserted rearwardly through bushings 44 and into the apertured necks of hubs 45. Ram 19 is actuated to drive the upper punch assembly 15 downwardly until the upper punches contact the necks 47 of the hubs. Upon continued downward movement of the ram following such contact, the hubs and all of the elements supported by platen 13, including cannula clamp 73, are urged downwardly to bring the undersurfaces of the necks or sleeves of the hubs into contact with lower punches 22 and to enclose the necks circumferentially. As downward movement of the ram continues, the necks of the hubs are re-formed by the opposing and interfitting punches and the cannulae and hubs are securely staked together.

After the ram has completed its upward stroke, an operator releases clamp 73, lifts clamp bar 63 and withdraws the hub bar assembly 49 with its load of finished hypodermic needle units. Stripping of the needle units from the tapered ends of positioning pins 52 may be achieved by simply sliding the stripper plate 53 forwardly against the ends of the hubs.

A finished hypodermic needle unit is shown in FIGURE 10 and is designated generally by the numeral 77. The cannula 48 is conventional, as is the body portion 46 of hub 45. While the body is shown as having external ribs 78, it is to be understood that these ribs may be eliminated and that different external configurations for the hub body may be provided. In the event that it is desired to stake a hub having a body of different external configuration, the only change required in the apparatus is the substitution of bushings 40 to match the different hub.

The only part significantly deformed during the staking operation is the sleeve or neck portion 47 of each hub. As shown in FIGURE 7, neck 47 is of generally cylindrical shape at the commencement of the staking operation. The axial opening or aperture 79 in the neck is of substantially larger diameter than the outside diameter of the cannula 48 extending therethrough. This substantial size differential is important for ease of assembly of the parts and the fact that the present apparatus is effective in staking the parts together under such conditions is an important aspect of the invention. It has been found that effective staking is achieved even when the inside diameter of the neck is more than twice the external diameter of a cannula extending therethrough.

It will be observed from FIGURE 7 that the distance between the parallel surfaces 32 of the upper punch (or between side surfaces 26 of the lower punch) is substantially greater than the outside diameter of neck 47. It will also be noted that when both punches first contact the neck 47, the lower punch is already received within the recess 31 of the upper punch and, therefore, the neck, blocked at opposite ends by pin 52 and bushing 44, is substantially completely confined.

The radius of curvature of arcuate openings or indentations 27 and 33 is substantially less than the radius of the neck's outside surface. As a result, initial contact between the neck and the punches occurs at spaced points 80 where the edges formed by the juncture of surfaces 33 and 34, and 27 and 28 engage the neck of the hub. In FIGURE 7 it will be noted that a four point contact is made. Preferably, the angular distance between the points of initial contact of the opposing punches falls within the range of 20 to 60 degrees.

As the punches are forced together, lateral bulges 81 are formed in the neck of the hub, the material of the hub flowing in the directions indicated generally by arrows 82 in FIGURE 8. It is important that the flow of material at this stage is in radial directions substantially normal to the directions of relative movement of the punches. Because of the inward flow of material from the sides of the neck, the opening or bore 79 of the neck assumes a generally oval cross section, the oval being vertically elongated.

Continued movement of the punches towards each other brings the arcuate surfaces 27 and 33 into contact with the hub and, upon such contact, the material of the neck of the hub is forced radially in the same directions as the movement of the punches. Thus, as a second stage in the re-forming of the neck 47, the material of the neck is forced radially to close the remaining spaces 79 illustrated in FIGURE 8. The neck of the re-formed hub, as shown in FIGURES 9 and 10, is no longer completely cylindrical in shape but is provided with longitudinal ribs 83 formed from bulges 81.

Since each hub and cannula are stacked together by only two punches or dies, it is apparent that the method of staking as disclosed herein is readily adaptable to high-speed automation simply by mounting a plurality of such punches on upper holder 29 and on frame 11, as shown in the drawings. Thus, with one stroke of ram 19, a plurality of cannulae are staked within their respective hubs.

While in the foregoing an embodiment of the invention has been disclosed in considerable detail for purposes of illustration, it will be understood by those skilled in the art that many of these details may be varied without departing from the spirit and scope of the invention.

I claim:

1. In an apparatus for securing a cannula to a hub having a body portion and a sleeve portion, means for supporting said hub, an insert member insertable into said body portion of said hub and engageable with the end wall between said body portion and said sleeve portion of said hub, an apertured member engageable with the end of said sleeve portion, said members restraining axial flow of material of said sleeve portion when the same is subjected to radial compressive forces, means for supporting a cannula within the bore of said sleeve portion, and a pair of opposing punches movable radially with respect to the sleeve portion of said hub, one of said punches being recessed to receive the other of said punches for limiting lateral displacement of material of said sleeve portion when said punches are urged into contact therewith.

2. The structure of claim 1 in which each of said punches has a central surface indentation and straight side surfaces adjacent thereto, said side surfaces extending transversely to the direction of movement of said punches relative to said hub.

3. The structure of claim 1 in which said insert member is movable axially with respect to said apertured member, and means for urging said insert member in the direction of said apertured member to force a hub carried by said insert member into abutment with said apertured member.

4. In an apparatus for staking a cannula within a hub, a pair of dies for re-forming the cylindrical neck of a pre-formed hub to secure a cannula within the bore of said neck, said dies each having a thickness substantially the same as the length of said neck, one of the dies being recessed to receive the other of said dies for completely enclosing the circumference of said neck when both of said dies are in engagement therewith, and each of said dies being provided with an arcuate neck-engaging surface and a pair of lateral surfaces adjacent thereto, said arcuate surfaces each having a smaller radius of curvature than the radius of said cylindrical neck prior to re-forming thereof.

5. In an apparatus for securing a cannula and hub together, a pair of dies for re-forming the cylindrical neck of a pre-formed hub to secure a cannula within the enlarged bore of said neck, one of said dies being recessed to receive the other of said dies for completely enclosing the circumference of said neck when both of said dies are in engagement therewith, means mounting said dies for relative movement towards and away from each other, means for supporting a hub with its neck disposed between said dies and with the axis thereof extending normal to the direction of movement of said dies, and means being provided for limiting axial displacement of material of said neck as said dies are urged towards each other to re-form said neck.

6. The structure of claim 5 in which said dies are of uniform thickness corresponding with the axial dimensions of the neck of a hub.

7. The structure of claim 5 in which each of said dies is provided with an arcuate neck-engaging surface of smaller radius of curvature than the radius of the cylindrical neck of a hub prior to re-forming thereof, each of said dies also being provided with lateral surfaces adjacent said arcuate surfaces and extending transversely with reference to the direction of relative movement of said dies.

References Cited by the Examiner

UNITED STATES PATENTS

| | | | |
|---|---|---|---|
| 970,669 | 9/1910 | Vallone et al. | 29—517 XR |
| 1,727,896 | 9/1929 | Mraz | 153—1 |
| 1,911,775 | 5/1933 | Smith et al. | 29—517 |
| 2,844,149 | 7/1958 | Gettig | 29—517 XR |
| 2,958,929 | 11/1960 | Vineberg et al. | 29—517 XR |
| 2,972,186 | 2/1961 | Howe | 29—516 |
| 3,010,183 | 11/1961 | Forney et al. | 29—155.55 |
| 3,012,274 | 12/1961 | Levy | 29—155.55 |
| 3,074,159 | 1/1963 | Baldwin et al. | 29—520 |
| 3,093,182 | 6/1963 | Vanderhoof | 153—1 |

CHARLIE T. MOON, *Primary Examiner.*

W. A. WILTZ, *Examiner.*